United States Patent
Israr et al.

(10) Patent No.: US 10,013,059 B2
(45) Date of Patent: Jul. 3, 2018

(54) HAPTIC AUTHORING TOOL FOR ANIMATED HAPTIC MEDIA PRODUCTION

(71) Applicant: Disney Enterprises, Inc., Burbank, CA (US)

(72) Inventors: Ali Israr, Monroeville, PA (US); Jonathan Moran, Los Angeles, CA (US); Oliver Stirling Schneider, British Columbia (CA)

(73) Assignee: Disney Enterprises, Inc., Burbank, CA (US)

( * ) Notice: Subject to any disclaimer, the term of this patent is extended or adjusted under 35 U.S.C. 154(b) by 496 days.

(21) Appl. No.: 14/678,271

(22) Filed: Apr. 3, 2015

(65) Prior Publication Data

US 2016/0291694 A1 Oct. 6, 2016

(51) Int. Cl.
*G06F 3/01* (2006.01)
*G06T 11/20* (2006.01)

(52) U.S. Cl.
CPC .............. *G06F 3/016* (2013.01); *G06T 11/20* (2013.01)

(58) Field of Classification Search
CPC .................................. G06F 3/016; G06T 11/20
USPC ......................................................... 345/474
See application file for complete search history.

(56) References Cited

U.S. PATENT DOCUMENTS

| | | | | |
|---|---|---|---|---|
| 2011/0157088 A1* | 6/2011 | Motomura | .............. | G06F 3/014 345/174 |
| 2011/0242113 A1* | 10/2011 | Keall | .................... | G06F 9/3857 345/505 |
| 2012/0092146 A1* | 4/2012 | Ryu | ..................... | G09B 21/003 340/407.1 |
| 2014/0189507 A1* | 7/2014 | Valente | ............... | G06F 3/04845 715/705 |
| 2014/0257806 A1* | 9/2014 | Dykstra-Erickson | ... | G10L 21/10 704/235 |

* cited by examiner

*Primary Examiner* — Zhengxi Liu
*Assistant Examiner* — Yi Yang
(74) *Attorney, Agent, or Firm* — Patterson + Sheridan, LLP (57) ABSTRACT

Systems, methods, and computer program products to perform an operation comprising receiving input specifying one or more positional and dimensional properties of a first haptic animation object in an animation tool displaying a representation of a vibrotactile array comprising a plurality of actuators configured to output haptic feedback, computing, based on a rendering algorithm applied to the first haptic animation object, a vector profile for each of the actuators, and computing an intensity value for each of the actuators based on the vector profile of the respective actuator.

19 Claims, 7 Drawing Sheets

HAPTIC AUTHORING TOOL FOR ANIMATED HAPTIC MEDIA PRODUCTION

BACKGROUND

Field of the Invention

Embodiments disclosed herein relate to haptic feedback. More specifically, embodiments disclosed herein provide authoring tools for animated haptic media production.

Description of the Related Art

Haptic feedback has added a new dimension to modern entertainment and media applications, enhancing user interaction and immersion. Recent haptic technologies supplement movies, applications, games, and social activities with coherent and synchronized cues, creating dynamic and engaging haptic effects perceived by a user's body. However, these technologies have seen limited adoption, partly due to a dearth of haptic authoring tools that allow artists and designers to create rich haptic content. Similarly, any existing tools are not able to generate content that is universally applicable to the varying types of haptic hardware. In addition, most existing tools are designed for a single actuator, and those that accommodate multiple actuators require individual control of each actuator. These multi-track authoring tools are cumbersome and complicated for systems having dozens of actuators.

SUMMARY

Embodiments disclosed herein include systems, methods, and computer program products to perform an operation comprising receiving input specifying one or more positional and dimensional properties of a first haptic animation object in an animation tool displaying a representation of a vibrotactile array comprising a plurality of actuators configured to output haptic feedback, computing, based on a rendering algorithm applied to the first haptic animation object, a vector profile for each of the actuators, and computing an intensity value for each of the actuators based on the vector profile of the respective actuator.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Embodiments disclosed herein provide an authoring interface for users to generate animated haptic content. The interface allows users to create haptic animation objects, which are visualized abstract phantom sensations that can be moved in both time and space on multi-actuator vibrotactile arrays using the interface. Embodiments disclosed herein render the haptic animation objects using a rendering pipeline that translates the designed haptic patterns to vibrotactile arrays. The rendering pipeline uses perceptual models for user-optimized haptic media on actuator grids used in haptic hardware. By creating a phantom vibration sensation (a spatial vibration perceived in-between physical actuators), embodiments disclosed herein allow the creation of continuous spatial sensations with device independence.

Embodiments disclosed herein use spatial and temporal characteristics of vibrotactile perception, allowing users to edit in space and time to generate dynamic and expressive haptic media. Embodiments disclosed herein allow both animation-based and individual track-based control of haptic sensation, thus allowing fine editing and tuning of haptic experiences on the fly. Furthermore, by leveraging hardware configuration files, the techniques described herein are independent of the underlying implementation of multi-actuator haptic hardware. In addition, users are allowed to "keyframe" tactile patterns by adding variations and fidelity in haptic content. Embodiments disclosed herein allow users to export media in different formats, allowing other tools and protocols to access the haptic media data, while also allowing copy/paste like editable features for quick authoring of repetitive haptic effects.

Figure 1A:
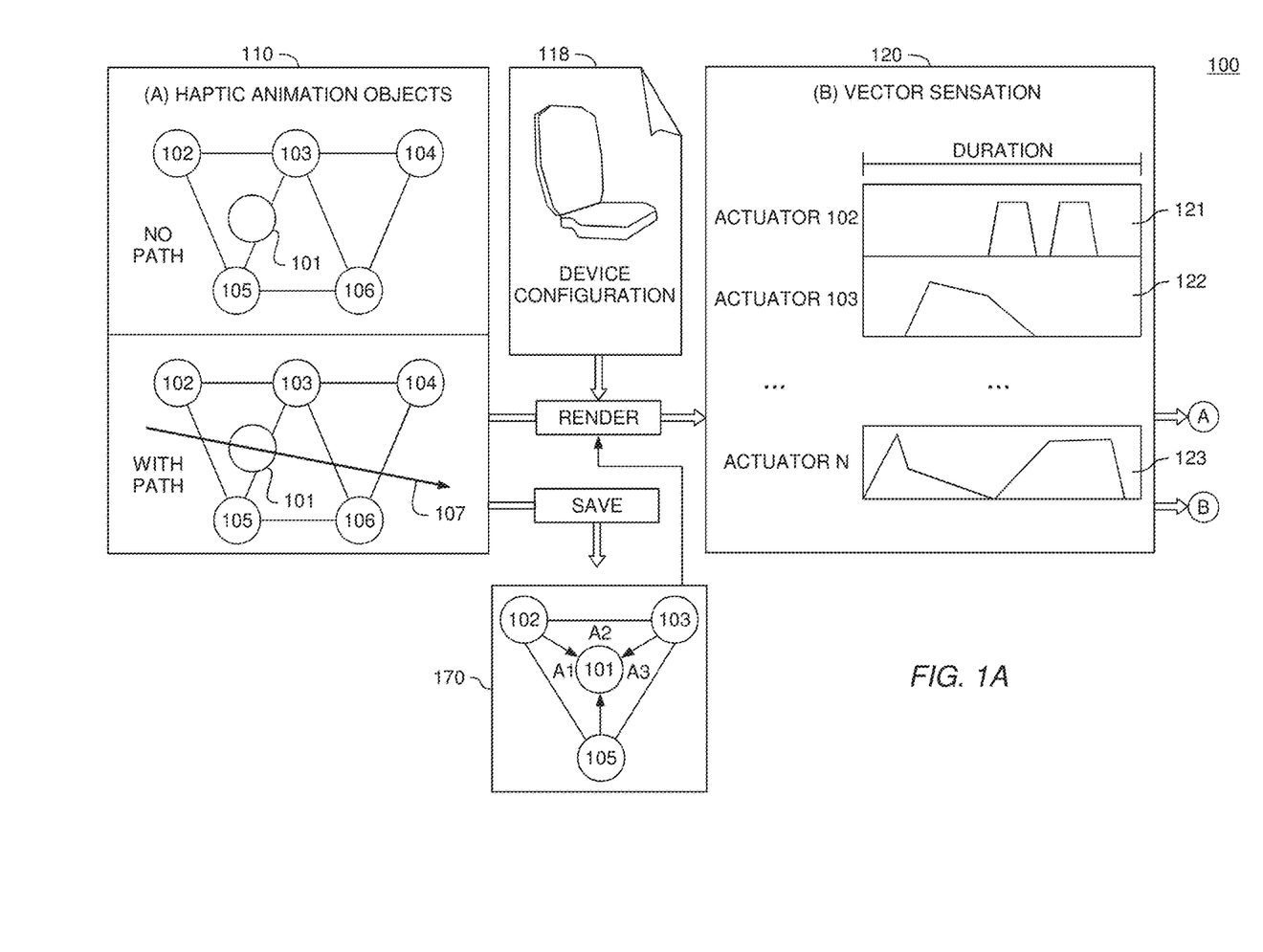
FIGS. 1A-1B are schematics illustrating techniques to provide authoring tools for animated haptic media production, according to one embodiment.

FIG. 1A is a schematic 100 illustrating techniques to provide authoring tools for animated haptic media production, according to one embodiment. As shown, the schematic depicts stages 110, 120, and 130 of a processing pipeline. Specifically, stage 110 depicts a haptic animation object 101 created by a user, while stage 120 depicts a rendering stage, and stage 130 depicts a rasterization stage. The output of the stages 110, 120, 130 may be produced via haptic animation hardware disposed in one or more devices 151, 152, 153. For example, device 151 is a smart phone (or gaming device) which includes a vibrotactile array 161 of physical actuators. Similarly, device 152 is a wearable jacket including a vibrotactile array 162 of physical actuators, while device 153 is a chair that includes a vibrotactile array 163 of physical actuators.

Generally, haptic animation objects are high-level specifications of virtual sensations moving on a two-dimensional vibrotactile array of actuators. Therefore, as shown in stage 110, the haptic animation object 101 is depicted among a visualization of a set of actuators 102-106. The actuators 102-106 may represent physical actuators disposed in a given vibrotactile array 161-163 of actuators. Embodiments disclosed herein may leverage a configuration file specifying the actual configuration of actuators in the vibrotactile arrays 161-163 (therefore displaying, for the user, a pattern of actuators 102-106 matching the configuration of the arrays 161-13). As shown in stage 110, the haptic animation object 101 may be static, or the user may specify a path 107 for the haptic animation object 101 to travel across. Generally, the user may create any number and type of haptic animation objects 101. A given haptic animation object 101 may include a number of parameters, such as location, size, duration and other semantic qualities such as frequency.

Once the user has created the desired haptic animation objects, embodiments disclosed herein may render the animation to create vector profiles for each actuator 102-106. As shown in stage 120, the output of the rendering stage is a vector profile for each actuator 102-106. The vector profile for each actuator 102-106, is reflected by a respective graphical representation 121-123. The vectors generated for each actuator 102-106 may include parameters such as duration, amplitude envelopes (such as fade-ins or fade-outs), frequencies, and start times. Generally, the vectors may include any type of information related to controlling a given actuator 102-106. Being device-specific, the vector formats offer finer sensation control than haptic animation objects.

In one embodiment, a rendering algorithm may be used to render the haptic animation object 101 to the hardware actuators. Generally, the rendering algorithm translates the animations created in by the user to animated vibrotactile patterns on the underlying hardware. As shown in box 170, embodiments disclosed herein may compute the barycentric coordinates $a_1$, $a_2$, $a_3$, of the haptic animation object 101 relative to a triangle defined by three actuators, in this example, actuators 102, 103, and 105. The barycentric coordinates $a_1$, $a_2$, $a_3$ may then be scaled by an interpolation method to compute an actual intensity value for each actuator 102, 103, 105. Generally, an intensity value, as described herein, relates to one or more output properties of the actuators, such as amplitude, frequency, duration, and the like. In at least one embodiment, the interpolation method (or rendering algorithm) may be selected from one of the following equations:

$$\text{Linear: } Ai = a_i \times Av$$
$$\text{Logarithmic: } Ai = \frac{\log a_i + 1}{\log A_{max} + 1} \times Av$$
$$\text{Power: } Ai = \sqrt{a_i} \times Av$$

Where Ai is the intensity of the output of an actuator i, $a_i$ is a barycentric coordinate, and Av is the intensity of the haptic animation object 101. In at least one one embodiment, the intensity of the output of a physical actuator is based on the size (i.e., the radius or diameter) of the haptic animation object 101 created by a user. For example, the greater the diameter of the haptic animation object 101, the more intense the output of an actuator. Doing so allows the user to control the intensity of the actuator output based on the size of the haptic animation object 101.

For example, applying the linear model provides a linear relationship between the barycentric coordinates and the amplitude of the vibrating actuators. In the logarithmic model, the barycentric coordinates are scaled in a logarithmic fashion, based on the fact that the perceived intensity is logarithmic related to the physical amplitude of the vibrating actuators. In the power model, the barycentric coordinates are coupled to the power (square of the amplitude) of the vibrating actuators.

Figure 1B:
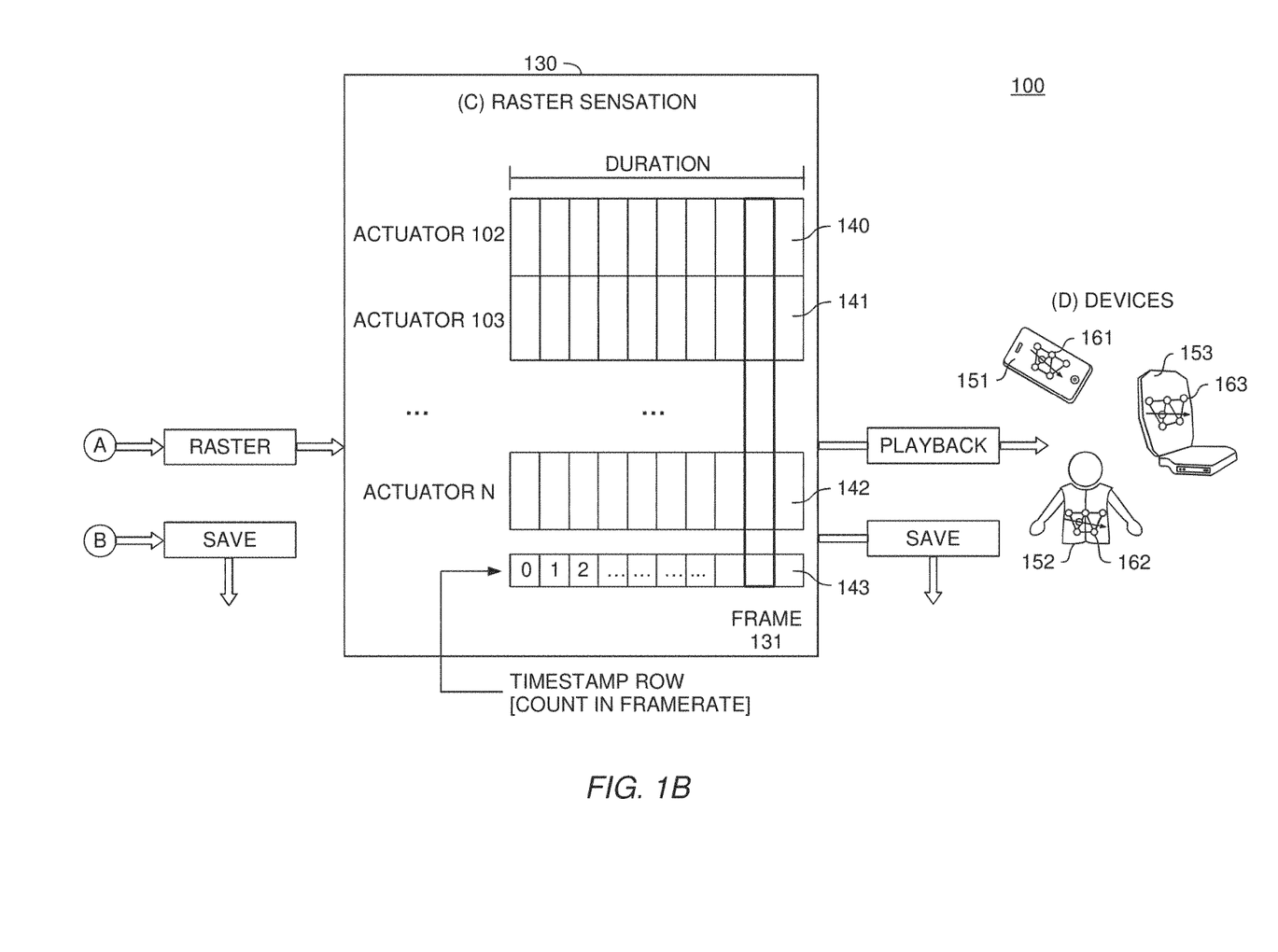

FIG. 1B is a continuation of the schematic 100 and depicts the rasterization process. As shown in stage 130, the rasterization process rasterizes the vector sensations into a series of frames. The rasterization process is suitable for playback operations or exporting to a device specific format. The output of the raster process is a matrix of actuator intensities.

Each row, such as row 140, 141, and 142 defines intensities for a given actuator, while a given column, such as the frame 131, defines the intensities at each time instance. A timestamp row 143 may be included which specifies timestamps of all rows at a frame defined by the rendering engine's framerate. A playback system may then parse the raster data, find a current row, and push the actuator settings to the device. Therefore, as shown, each vibrotactile array 161-163 of each device 151-153 may generate a phantom sensation mimicking the trajectory of the haptic animation object 101.

Although FIGS. 1A-1B depict a plurality of actuators, embodiments disclosed herein apply to vibrotactile arrays with any number of actuators. For example, the rendering process could translate vector profiles for two actuators (along a line between two actuators). As another example, the rendering process may translate a vector profile for a single actuator (e.g., a heartbeat could be generated by using a single actuator. A vector profile would not move locations, but may vary the properties of the actuator, such as amplitude envelope).

Figure 2:
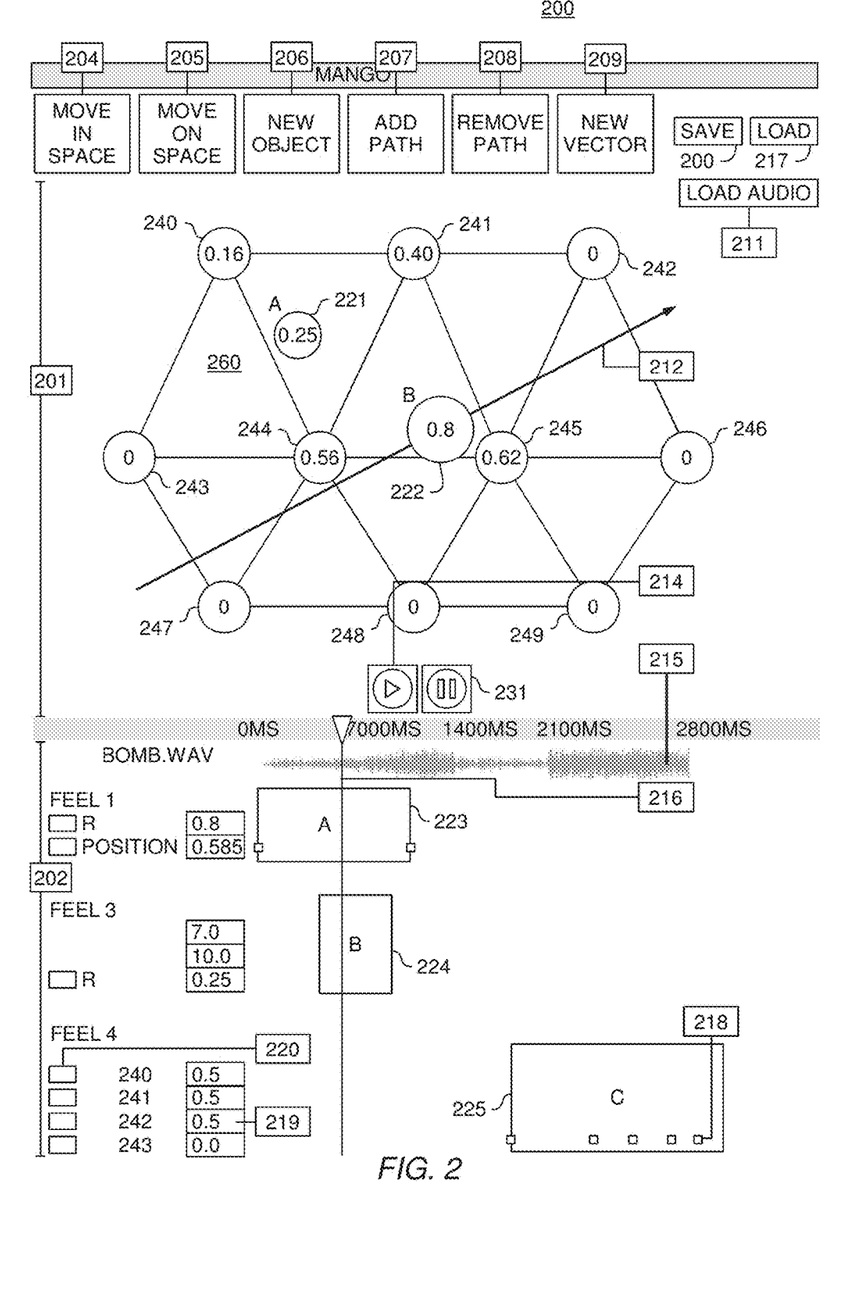
FIG. 2 illustrates a graphical user interface that provides authoring tools for animated haptic media production, according to one embodiment.

FIG. 2 illustrates a graphical user interface (GUI) 200 that provides authoring tools for animated haptic media production, according to one embodiment. As shown, the GUI 200 includes an animation window 201 and a timeline window 202. As shown, the animation window 201 may include representations of physical actuators 240-249. The placement of the actuators 240-249 may be generated based on a device configuration file that specifies the location and type of actuators, available rendering schemes, and any hardware-specific actuators. Based on this information, the GUI 200 may output a representation of triangles, such as the triangle 260, connecting each actuator 240-249. The triangles may be predefined in the configuration file, or may be programmatically generated using a triangulation algorithm (such as the Delaunay triangulation). Barycentric coordinates of a given haptic object can then be determined with respect to a particular triangle in order to determine the object's position relative to the actuators represented by the triangle.

Generally, a user may use the animation window 201 to create haptic animation objects 221, 222, for which the hardware ultimately generates corresponding vibrotactile sensations (or haptic feedback) on the actuators 240-249. For example, the user may select button 206 to create a new haptic animation object, which is displayed in the animation window 201, which may display the size and position of the respective object. The position may be a set of (x,y) coordinates, which are not depicted in the animation window 201. For example, as shown, the haptic animation objects 221-222 have respective radii (or diameters) of 0.25 and 0.8, respectively. The radius of a given haptic animation object corresponds to the intensity of the haptic feedback ultimately output by the actuators 240-249. Therefore, a haptic animation object having a larger radius (object 222) will likely output haptic feedback with a greater intensity than a haptic animation object having a smaller radius (object 221). Although shown as depicting the diameters of the haptic animation objects 221, 222 as a normalized number between 0 and 1, other units may be used. For example, decibels (dB) or physical radii (where a correlation between perceived size and intensity is found) may be used.

As shown, buttons 207 and 208 may be used to add or remove a path, respectively, to a haptic animation object. For example, as shown, the user has added path 212 to haptic animation object 222. Generally, the motion of haptic animation objects is constrained to the defined path. For example, haptic animation object 222 may move from the beginning to the end of the path 212. An object having a path may have a single position parameter from 0 (beginning of the path) to 1 (end of the path), instead of (x,y) parameters, and is manipulated in different ways. Selecting the button 205 will cause the object 222 to move along the path 212 from start to end. Selecting the button 204 allows the user to move the object 222 and the path 212 together within the animation window 201. The path 212 may be redefined by clicking and dragging either end of the path 212. When rendered, the hardware actuators may provide the sensation of the object 222 moving along the path 212.

As shown, at any given point in time, each actuator 240-249 has a respective intensity value. For example, as shown, actuator 245 has an intensity value of 0.62 (on a scale from 0-1), while actuator 244 has an intensity value of 0.56, and actuator 249 has an intensity value of 0. The intensity values may be based on the size of the haptic animation objects 221, 222, and their proximity to a given actuator. The intensity values at a given time may be computed using the rendering algorithms described above. Generally, actuators 240-249 output the sum of all values generated by each haptic animation object created by the user, such as the haptic animation objects 221, 222.

Users may save or load animations to or from files via the save button 210 and load button 217, respectively. In at least one embodiment, the files are JavaScript Object Notation (JSON) files. As shown, button 211 allows users to load audio tracks, which may be visualized via the graph 215 in the timeline 202. Doing so allows the user to design haptic feedback for audio files. Overlay of video files may be provided in a similar manner (not shown).

As shown, the timeline 202 represents any haptic animation objects in the animation window 201 by a respective track 223-225, showing the objects' current position in time. For example, track 223 corresponds to haptic animation object 221, track 224 corresponds to haptic animation object 222, and track 225 corresponds to a haptic animation object that is not depicted in the animation window (for example, because the start time of depicting the haptic animation object has not occurred). The cursor 216 shows the current time, and can be dragged around by the user. Users may manipulate haptic animation objects via the tracks timeline 202. For example, by clicking and resizing the track 224, the user may cause the haptic animation object 222 to have a longer or shorter duration. Similarly, the parameters 219 allows users to provide different parameter values for each actuator.

By checking a box 220, a user may specify that a parameter is "keyframeable." A keyframeable parameter has a value that depends on the current time. When the value is changed, a keyframe 218 is automatically created at the current time. Values may be linearly interpolated between keyframe values.

New vector button 209 allows users to create vector sensations for a selected haptic animation object 221, 222. Vector sensations control each actuator 240-249 directly through parameter values, controlling the actuator's voltage from 0 to 1 (the same as controlling the radius parameter of the haptic animation objects 221, 222). The corresponding actuator may be highlighted in the animation window 201 when the text field 219 or track 223-225 is selected. In addition, each track 223-225 is keyframeable, allowing the user to manipulate each individual actuator 240-249 for fine tuning.

The play button 214 allows users to play an entire animation, while the pause button 231 allows users to pause the animation during playback. During playback, the animation runs in the animation window 201, while the corresponding parameters in the timeline 202 vary. Simultaneously, vibrotactile simulations (e.g., haptic feedback) may be activated on hardware connected to the system executing the GUI 200, allowing the user to feel the sensations. Further still, the GUI 200 allows for real-time feedback while manipulating haptic animation objects.

Figure 3:
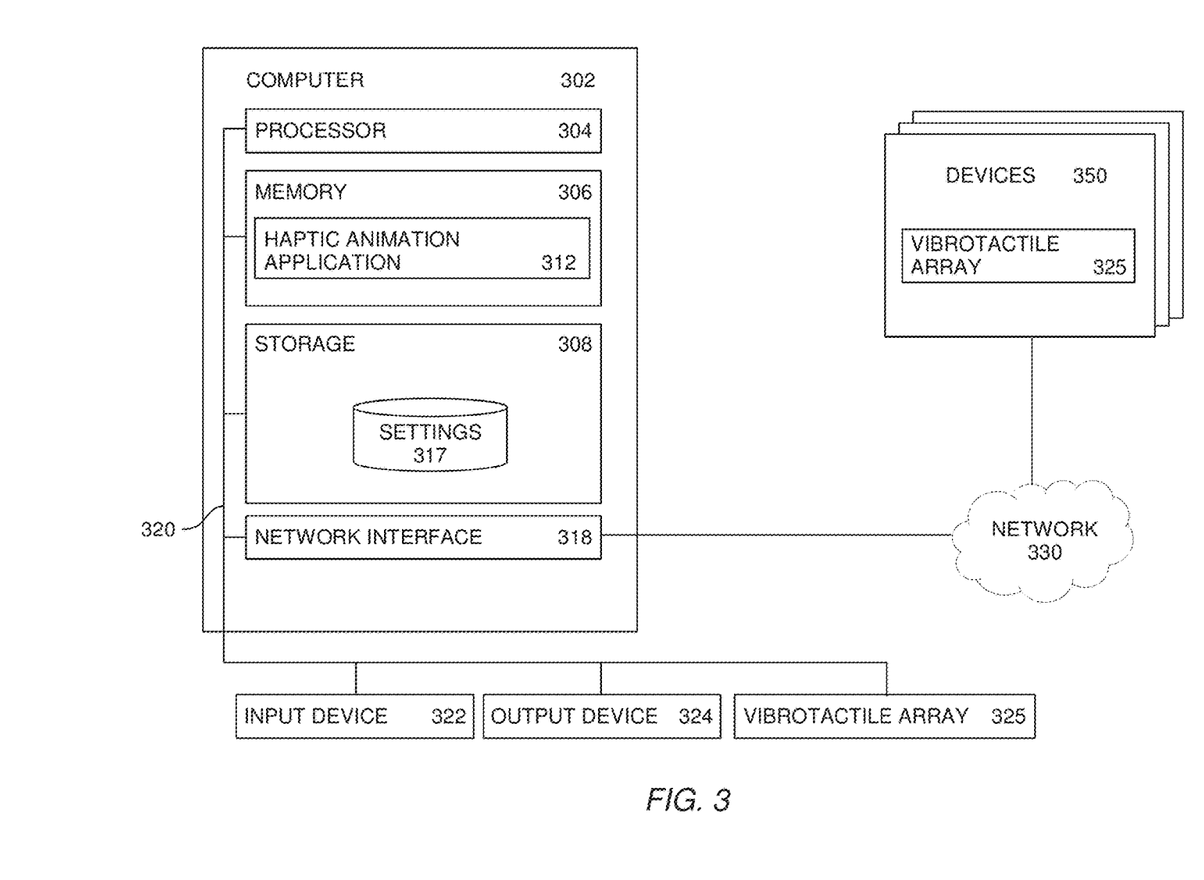
FIG. 3 is a block diagram illustrating a system that provides authoring tools for animated haptic media production, according to one embodiment.

FIG. 3 is a block diagram illustrating a system 300 that provides authoring tools for animated haptic media production, according to one embodiment. The system 300 includes a computer 302 connected to other computers via a network 330. In general, the network 330 may be a telecommunications network and/or a wide area network (WAN). In a particular embodiment, the network 330 includes access to the Internet.

The computer 302 generally includes a processor 304 which obtains instructions and data via a bus 320 from a memory 306 and/or storage 308. The computer 302 may also include one or more network interface devices 318, input devices 322, output devices 324, and vibrotactile array 325 connected to the bus 320. The computer 302 is generally under the control of an operating system. Examples of operating systems include the UNIX operating system, versions of the Microsoft Windows operating system, and distributions of the Linux operating system. (UNIX is a registered trademark of The Open Group in the United States and other countries. Microsoft and Windows are trademarks of Microsoft Corporation in the United States, other countries, or both. Linux is a registered trademark of Linus Torvalds in the United States, other countries, or both.) More generally, any operating system supporting the functions disclosed herein may be used. The processor 304 is a programmable logic device that performs instruction, logic, and mathematical processing, and may be representative of one or more CPUs. The network interface device 318 may be any type of network communications device allowing the computer 302 to communicate with other computers via the network 330.

The storage 308 is representative of hard-disk drives, solid state drives, flash memory devices, optical media and the like. Generally, the storage 308 stores application programs and data for use by the computer 302. In addition, the memory 306 and the storage 308 may be considered to include memory physically located elsewhere; for example, on another computer coupled to the computer 302 via the bus 320.

The input device 322 may be any device for providing input to the computer 302. For example, a keyboard and/or a mouse may be used. The input device 322 represents a wide variety of input devices, including keyboards, mice, controllers, and so on. The output device 324 may include monitors, touch screen displays, and so on. The vibrotactile array 325 is an object that includes one or more hardware actuators configured to output haptic feedback. Similarly, a plurality of devices 350 include a respective vibrotactile array 325. The devices 350 may be, for example and without limitation, smart phones, portable media players, portable gaming devices, wearable devices, furniture, and the like.

As shown, the memory 306 contains a haptic animation application (HAA) 312, which is generally configured to provide the GUI 200 and generate haptic feedback that is outputted by the actuators of the vibrotactile array 325. The HAA 312 may apply a rendering algorithm to haptic animation objects, such as the haptic animation objects 221-222, to translate the visual objects to sensations outputted by the actuators of the vibrotactile array 325. Generally, the HAA 312 may apply a rendering pipeline that converts the visual haptic animation objects to vector sensations and a raster format, the latter of which outputs to hardware, such as the vibrotactile array 325.

The rendering algorithm applied by the HAA 312 translates virtual percepts to the vibrotactile array 325. Initially, the HAA 312 may construct a Delaunay triangulation for all actuators in the array 325 to define a mesh on the array 325. At each instant of rendering, the HAA 312 uses barycentric coordinates of the haptic animation objects relative to a triangle defined by three real actuators of the array 325. The HAA 312 may then apply an interpolation method (linear, logarithmic, or power, as described above), to determine the actual intensity of each actuator in the array 325.

As shown, the storage includes the output 316 and the settings 317. The output 316 may be configured to store output generated by the HAA 312, such as vector profiles generated during the rendering phase, the matrix of actuator intensity data generated during the rasterizing phase, and the like. The settings 317 may include hardware-specific settings and parameters for a given vibrotactile array 325. The settings 317 may specify, without limitation, a width and height of the vibrotactile array 325, a dictionary of actuator types (e.g., voice coils, rumble motors) each with a list of control parameters (e.g., frequency, intensity) specifying minimum and maximum allowable values, a location and type of each actuator in the vibrotactile array 325, communication protocols and rendering methods supported by the vibrotactile array 325, and default settings of the vibrotactile array. In the event a device 350 has more than one vibrotactile array 325 (such as in the back and seat of a chair), the settings 317 may specify height and width for each array 325, with each array 325 separated by a corresponding identifier.

Figure 4:
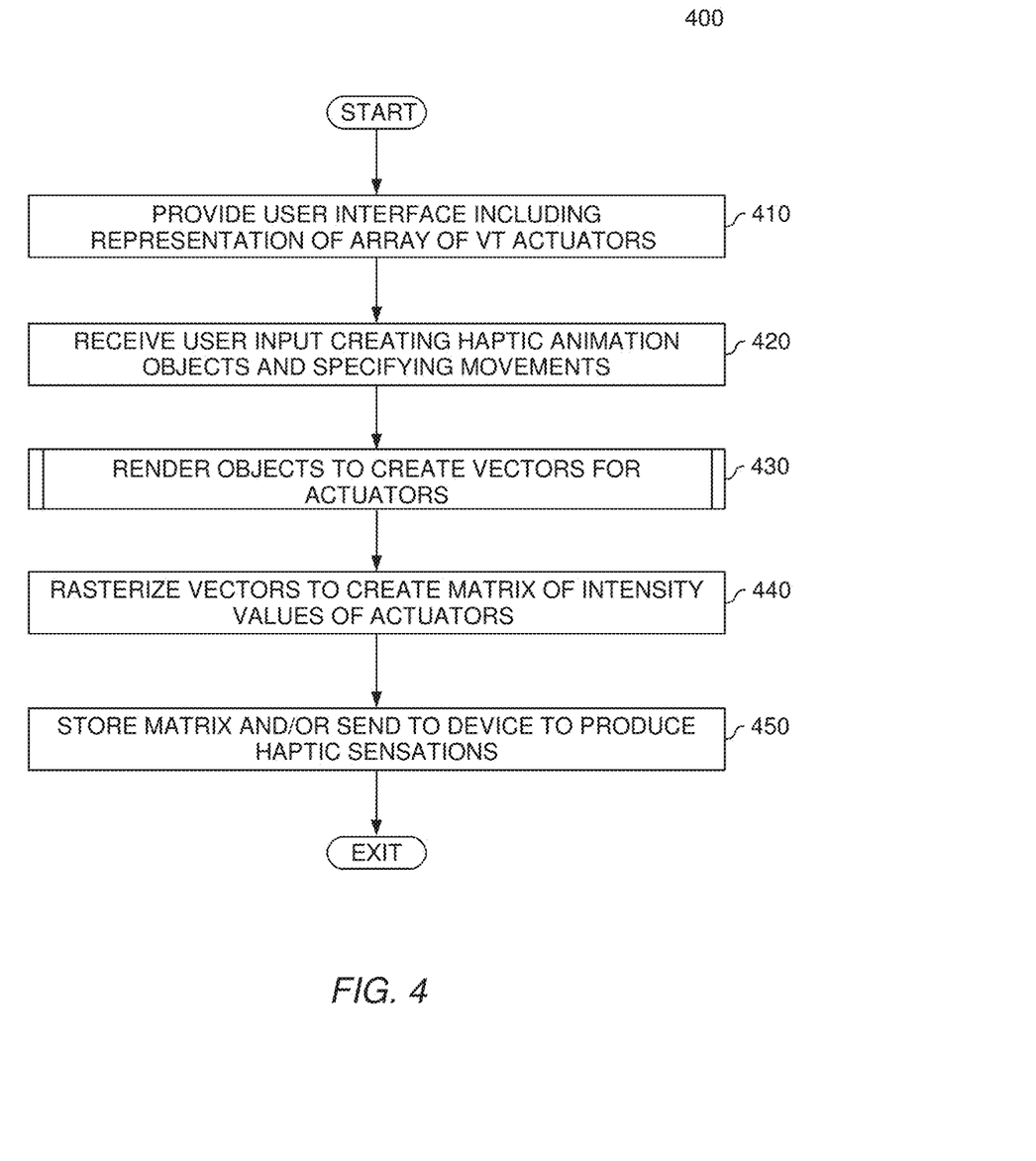
FIG. 4 is a flow chart illustrating a method to provide authoring tools for animated haptic media production, according to one embodiment.

FIG. 4 is a flow chart illustrating a method 400 to provide authoring tools for animated haptic media production, according to one embodiment. As shown, the method 400 begins at step 410, where the haptic animation application (HAA) 312 provides the user interface, such as the GUI 200, that includes a representation of a vibrotactile array 325 including a plurality of actuators. At step 420, a user provides input creating haptic animation objects and specifying any movements or paths the objects should move along. The user may also provide other details regarding the haptic animation objects, such as radius (or size), start times, end times, durations, frequencies, and the like. For example, a user may specify a position, size, and frequency parameter for a moving virtual point, while specifying a position, frequency, and size of a "rain" effect.

At step 430, the HAA 312 may render the haptic animation objects created by the user to create vectors for the actuators in the vibrotactile array 325. At step 440, the HAA 312 may rasterize the vectors created at step 430 to create a matrix of intensity values for the actuators in the vibrotactile array 325. Each row of the matrix of actuator intensities may define intensities of an actuator, while each column contains an intensity value at a corresponding instance of time. At step 450, the HAA 312 may store the computed matrix and/or send the computed matrix to a device, which may parse the raster data, finds the correct row, and pushes the settings to the respective actuator.

Figure 5:
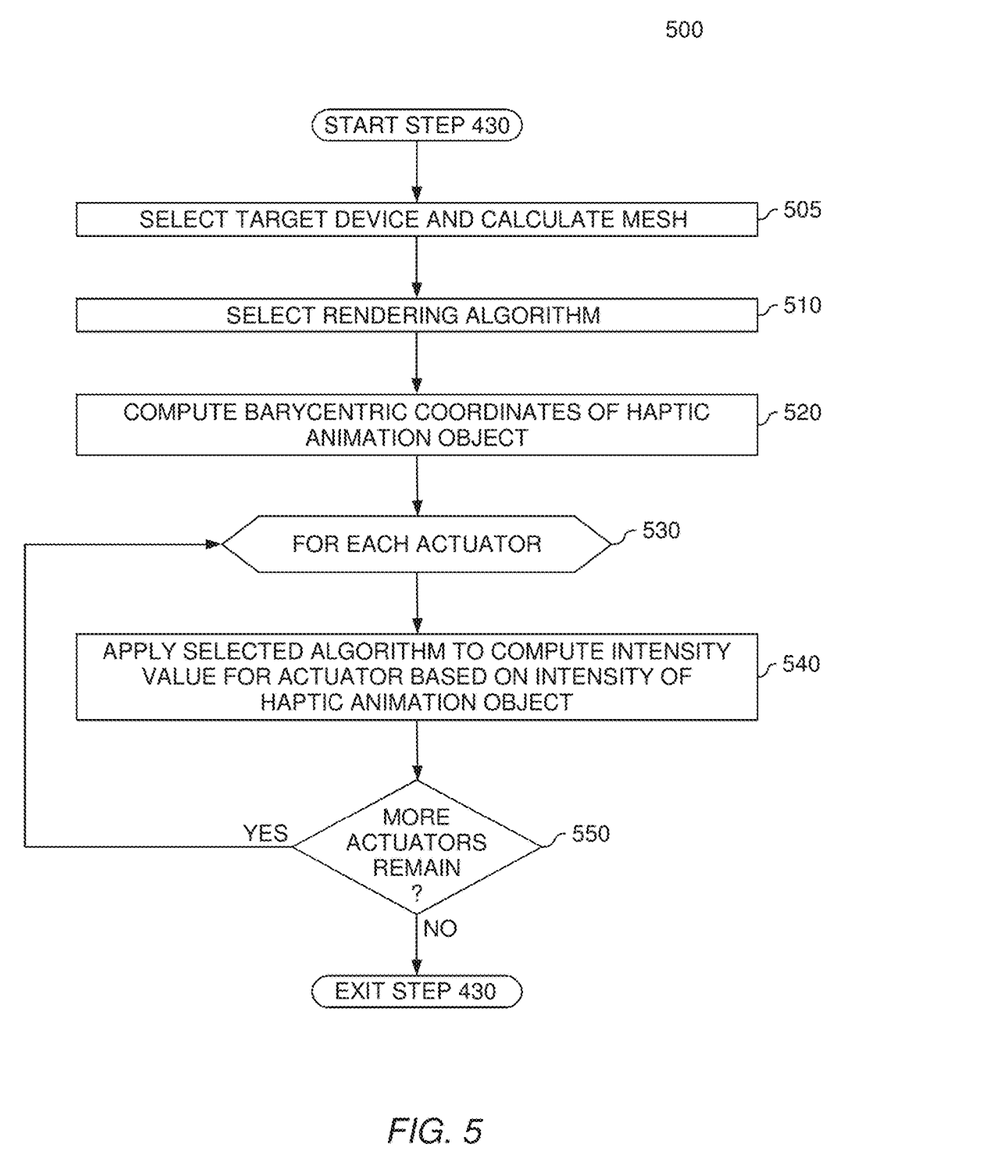
FIG. 5 is a flow chart illustrating a method to render haptic animations, according to one embodiment.

FIG. 5 is a flow chart illustrating a method 500 corresponding to step 430 to render haptic animations, according to one embodiment. Generally, the HAA 312 may perform the steps of the method 500 to translate haptic animation objects created by users to animated patterns that can be played back by the actuators of the vibrotactile array 325. Although depicted as being performed on a single haptic animation object, the HAA 312 may perform the steps of the method 500 for each haptic animation object created by a user.

At step 505, a user or the HAA 312 may select a target device including a vibrotactile array 325 (such as a chair, phone, and the like), and the HAA 312 may construct a Delaunay triangulation for all actuators to automatically define a mesh on the actuators of the vibrotactile array 325 of the selected device. At step 510, the HAA 312 (or a user) may select an interpolation algorithm, such as the linear, logarithmic, or power algorithms described above. At step 520, the HAA 312 may compute the barycentric coordinates of the haptic animation object relative to a triangle defined by three actuators. At step 530, the HAA 312 performs a loop including step 540 for each actuator. At step 540, the HAA 312 may apply the interpolation algorithm selected at step 510 to compute the intensity value for the current actuator based on the intensity of the haptic animation object. At step 550, the HAA 312 determines whether more actuators remain. If more actuators remain, the HAA 312 returns to step 530, otherwise, the method 500 ends.

Figure 6:
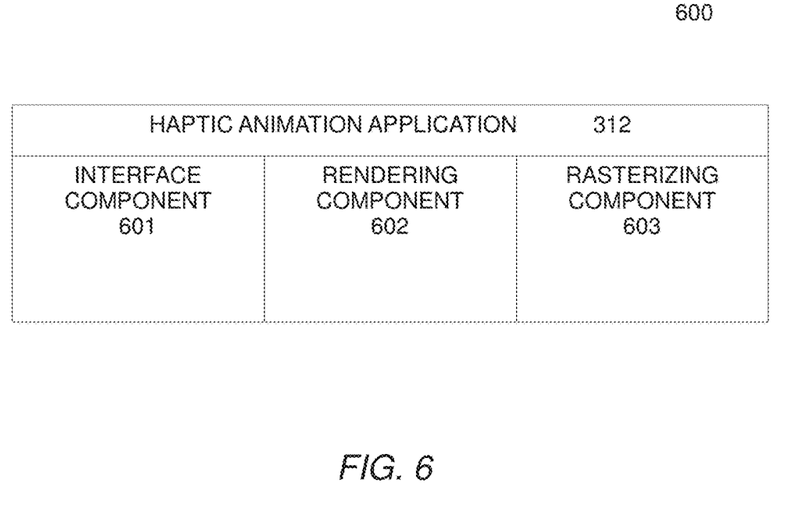
FIG. 6 is a block diagram illustrating components of a haptic animation application, according to one embodiment.

FIG. 6 is a block diagram 600 illustrating components of the haptic animation application (HAA) 312, according to one embodiment. As shown, the HAA 312 includes an interface component 601, a rendering component 602, and a rasterizing component 603. The interface component 601 is configured to output and manage a graphical user interface to create haptic animation objects, such as the GUI 200. The rendering component 602 is configured to render the created animation objects to compute output values for each actuator, as described in greater detail above. The output values may be a vector of values describing different properties of each actuator in the vibrotactile array 325. The rasterizing component 603 is configured to rasterize the parameters of the vectors created by the rendering component 602 to a matrix of intensity values for each actuator at a given point in time.

Advantageously, embodiments disclosed herein allow users to easily generate haptic effects based on haptic animation objects created in a graphical user interface. Advantageously, the techniques described herein create data that is consumable by all types of hardware configured to generate haptic feedback via a plurality of actuators.

In the foregoing, reference is made to embodiments of the invention. However, it should be understood that the invention is not limited to specific described embodiments. Instead, any combination of the recited features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the recited aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present invention, a user may access applications or related data available in the cloud. For example, the haptic animation application (HAA) 312 could execute on a computing system in the cloud and allow users to create animations including haptic feedback. In such a case, the HAA 312 could create haptic feedback and store output files including haptic feedback at a storage location in the cloud. Doing so allows a user to access this information from any computing system attached to a network connected to the cloud (e.g., the Internet).

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order or out of order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the foregoing is directed to embodiments of the present invention, other and further embodiments of the invention may be devised without departing from the basic scope thereof, and the scope thereof is determined by the claims that follow.

What is claimed is:

1. A method, comprising:
outputting for display in an animation tool, a graphical representation of a layout of a plurality of actuators of a vibrotactile array, each of the plurality of actuators configured to output haptic feedback;
generating a plurality of triangles representing the plurality of actuators, wherein each triangle is defined by three of the plurality of actuators;
receiving input specifying a location and a size of a first haptic animation object in the animation tool;
generating a set of barycentric coordinates of the first haptic animation object based on the position of the first haptic animation object relative to a first triangle of the plurality of triangles;
computing, based on a rendering algorithm applied to the set of barycentric coordinates of the first haptic animation object, a vector profile for each of the actuators, wherein the rendering algorithm defines a relationship between the size of the first haptic animation object and an amplitude of the haptic feedback outputted by the respective actuator, wherein the rendering algorithm comprises one of: (i) a linear function, (ii) a logarithmic function, and (iii) a power function;
computing an intensity value for each of the actuators based on the rendering algorithm applied to the size of the first haptic animation object and the vector profile of the respective actuator; and
outputting the intensity values to each of the actuators to produce a haptic feedback representing the first haptic animation object.

2. The method of claim 1, wherein the input further specifies: (i) a start time for producing the haptic feedback representing the first haptic animation object, and (ii) a duration of the haptic feedback.

3. The method of claim 1, wherein the actuators of the vibrotactile array are configured to output the haptic feedback representing the first haptic animation object responsive to receiving the computed intensity values.

4. The method of claim 1, wherein the input further specifies a path of the first haptic animation object, wherein the path is from a first position to a second position in the graphical representation of the layout of each actuator of the vibrotactile array, wherein the first haptic animation object travels from the first position at a first time to the second position at a second time.

5. The method of claim 4, wherein the vector profile comprises a set of parameters for each of the plurality of actuators at the first time and the second time, wherein intensity values are computed for each of the actuators at the first time and the second time.

6. The method of claim 5, wherein the set of parameters in the vector profile for the actuators comprise: (i) a duration of haptic feedback outputted by the respective actuator, (ii) the amplitude of the haptic feedback, (iii) a frequency of the haptic feedback, and (iv) a start time of the haptic feedback.

7. The method of claim 1, wherein the actuators, when receiving the intensity values, generate a single haptic sensation.

8. The method of claim 1, wherein the layout of the actuators of the vibrotactile array are stored in a configuration file, wherein the method further comprises:
receiving the layout of the plurality of actuators of the vibrotactile array; and
generating the graphical representation of the layout of each actuator of the vibrotactile array.

9. A computer program product, comprising:
a non-transitory computer-readable storage medium having computer-readable program code embodied therewith, which, when executed by a processor, performs an operation comprising:
outputting for display in an animation tool, a graphical representation of a layout of a plurality of actuators of a vibrotactile array, each of the plurality of actuators configured to output haptic feedback;
generating a plurality of triangles representing the plurality of actuators, wherein each triangle is defined by three of the plurality of actuators;
receiving input specifying a location and a size of a first haptic animation object in the animation tool;
generating a set of barycentric coordinates of the first haptic animation object based on the position of the first haptic animation object relative to a first triangle of the plurality of triangles;
computing, based on a rendering algorithm applied to the set of barycentric coordinates of the first haptic animation object, a vector profile for each of the actuators, wherein the rendering algorithm defines a relationship between the size of the first haptic animation object and an amplitude of the haptic feedback outputted by the respective actuator, wherein the rendering algorithm comprises one of: (i) a linear function, (ii) a logarithmic function, and (iii) a power function;
computing an intensity value for each of the actuators based on the rendering algorithm applied to the size of the first haptic animation object and the vector profile of the respective actuator; and
outputting the intensity values to each of the actuators to produce a haptic feedback representing the first haptic animation object.

10. The computer program product of claim 9, wherein the input further specifies: (i) a start time for producing the haptic feedback representing the first haptic animation object, and (ii) a duration of the haptic feedback.

11. The computer program product of claim 9, wherein the actuators of the vibrotactile array are configured to output the haptic feedback representing the first haptic animation object responsive to receiving the computed intensity values.

12. The computer program product of claim 9, wherein the input further specifies a path of the first haptic animation object, wherein the path is from a first position to a second position in the graphical representation of the layout of each actuator of the vibrotactile array, wherein the first haptic animation object travels from the first position at a first time to the second position at a second time.

13. The computer program product of claim 12, wherein the vector profile comprises a set of parameters for each of the plurality of actuators at the first time and the second time, wherein intensity values are computed for each of the actuators at the first time and the second time.

14. The computer program product of claim 13, wherein the set of parameters in the vector profile for the actuators comprise: (i) a duration of haptic feedback outputted by the respective actuator, (ii) the amplitude of the haptic feedback, (iii) a frequency of the haptic feedback, and (iv) a start time of the haptic feedback, wherein the operation further comprises:
   receiving the layout of the plurality of actuators of the vibrotactile array; and
   generating the graphical representation of the layout of each actuator of the vibrotactile array.

15. The computer program product of claim 9, wherein the authoring tool comprises a graphical user interface (GUI) configured to display the first haptic animation object and enable spatiotemporal manipulation of the first haptic object to receive the input.

16. A system, comprising:
   one or more computer processors; and
   a memory containing a program which when executed by the processors performs an operation comprising:
      outputting for display in an animation tool, a graphical representation of a layout of a plurality of actuators of a vibrotactile array, each of the plurality of actuators configured to output haptic feedback;
      generating a plurality of triangles representing the plurality of actuators, wherein each triangle is defined by three of the plurality of actuators;
      receiving input specifying a location and a size of a first haptic animation object in the animation tool;
      generating a set of barycentric coordinates of the first haptic animation object based on the position of the first haptic animation object relative to a first triangle of the plurality of triangles;
      computing, based on a rendering algorithm applied to the set of barycentric coordinates of the first haptic animation object, a vector profile for each of the actuators, wherein the rendering algorithm defines a relationship between the size of the first haptic animation object and an amplitude of the haptic feedback outputted by the respective actuator, wherein the rendering algorithm comprises one of: (i) a linear function, (ii) a logarithmic function, and (iii) a power function;
      computing an intensity value for each of the actuators based on the rendering algorithm applied to the size of the first haptic animation object and the vector profile of the respective actuator; and
      outputting the intensity values to each of the actuators to produce a haptic feedback representing the first haptic animation object.

17. The system of claim 16, wherein the input further specifies: (i) a start time for producing the haptic feedback representing the first haptic animation object, and (ii) a duration of the haptic feedback.

18. The system of claim 16, wherein the input further specifies a path of the first haptic animation object, wherein the path is from a first position to a second position in the graphical representation of the layout of each actuator of the vibrotactile array, wherein the first haptic animation object travels from the first position at a first time to the second position at a second time, wherein the operation further comprises:
   receiving the layout of the plurality of actuators of the vibrotactile array; and
   generating the graphical representation of the layout of each actuator of the vibrotactile array.

19. The system of claim 18, wherein the vector profile comprises a set of parameters for each of the plurality of actuators at the first time and the second time, wherein intensity values are computed for each of the actuators at the first time and the second time, wherein the set of parameters in the vector profile for the actuators comprise: (i) a duration of haptic feedback outputted by the respective actuator, (ii) the amplitude of the haptic feedback, (iii) a frequency of the haptic feedback, and (iv) a start time of the haptic feedback.

* * * * *